(12) United States Patent
Ramasamy et al.

(10) Patent No.: US 8,937,864 B2
(45) Date of Patent: Jan. 20, 2015

(54) CHANNEL QUALITY AWARE TRANSPORT FLOW COMPENSATION

(75) Inventors: Arivu Mani Ramasamy, San Jose, CA (US); Anand Oswal, Pleasanton, CA (US); Rajeev Koodli, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 514 days.

(21) Appl. No.: 13/311,656

(22) Filed: Dec. 6, 2011

(65) Prior Publication Data

US 2013/0142047 A1    Jun. 6, 2013

(51) Int. Cl.
*H04J 1/16*      (2006.01)
*H04L 1/00*      (2006.01)
*G06F 15/173*    (2006.01)
*H04L 12/801*    (2013.01)
*H04L 12/835*    (2013.01)

(52) U.S. Cl.
CPC .............. *H04L 47/10* (2013.01); *H04L 47/30* (2013.01)
USPC ........ 370/235; 370/229; 370/236; 370/395.3; 379/56.2; 709/226

(58) Field of Classification Search
CPC ............................................. H04M 2215/7464
USPC .............. 370/229, 235, 236, 395.3; 379/56.2; 709/226
See application file for complete search history.

(56) References Cited

U.S. PATENT DOCUMENTS

| | | | |
|---|---|---|---|
| 7,639,625 B2 | 12/2009 | Kaminsky et al. | |
| 7,937,470 B2 * | 5/2011 | Curley et al. | 709/226 |
| 8,411,560 B2 * | 4/2013 | Samuels et al. | 370/229 |
| 2002/0015477 A1 * | 2/2002 | Geile et al. | 379/56.2 |
| 2004/0066783 A1 * | 4/2004 | Ayyagari | 370/395.3 |
| 2011/0255537 A1 | 10/2011 | Ramasamy et al. | |
| 2012/0113809 A1 * | 5/2012 | Cortes Gomez | 370/235 |
| 2014/0050095 A1 * | 2/2014 | Szilagyi et al. | 370/236 |

* cited by examiner

*Primary Examiner* — Jung Park
*Assistant Examiner* — Chuong M Nguyen
(74) *Attorney, Agent, or Firm* — Edell, Shapiro & Finnan, LLC

(57) ABSTRACT

Channel quality of an airlink is assessed at an edge router of a radio-access communication network. Based on the assessment, the cause of lost data is determined to be due to traffic congestion or due to poor channel quality. In the latter case, congestion recovery/avoidance processes of a transport protocol of over a spliced transport connection can be overridden to avoid unnecessary limitations to data flow.

21 Claims, 6 Drawing Sheets

CHANNEL QUALITY AWARE TRANSPORT FLOW COMPENSATION

TECHNICAL FIELD

The present disclosure relates to traffic flow control in communications networks.

BACKGROUND

Certain network architectures, such as the so-called third generation (3G) mobile networks are inherently hierarchical: numerous mobile devices communicate with a base station; data from multiple base stations are aggregated at a cellular site edge router; multiple edge routers may be serviced by an aggregation router to provide traffic onto a backhaul network, and so on. Access to the backhaul network, which may comprise highly aggregated data flows, may be provided through a lease that specifies data bandwidth per unit cost. Clearly, then, superfluous data or inefficient transfer of data on the backhaul network can prove costly.

To a user of certain network devices, e.g., mobile devices such as web-enabled cellular phones, perceived performance is affected by end-to-end transport of packets between the user's device and the Internet. The transport mechanisms by which the end-to-end connections are established and controlled bear the burden of accommodating varying transmission media and overcoming congestion at interfaces of different media access. It is well understood that 3G mobile network performance, for example, is hampered by congestion at the cellular site, which leads to poor packet delivery over-the-air. However, poor packet delivery over-the-air can trigger the transport control mechanisms used to overcome congestion, which can lead to a reduction in data flow efficiency. When such inefficiency is carried through to the backhaul network, the increased costs are in turn carried by the lessee thereof.

DESCRIPTION OF EXAMPLE EMBODIMENTS

Overview

A spliced transport connection is established through network segments conveying network data. A communication channel, such as a radio link, is established to carry the network data in one of the connection segments forming the spliced connection. The quality of the channel is assessed, such as by inference from traffic conditions in the network segment carrying the connection segment, and transport control on the connection segment is performed based upon the channel quality.

Example Embodiments

Figure 1:
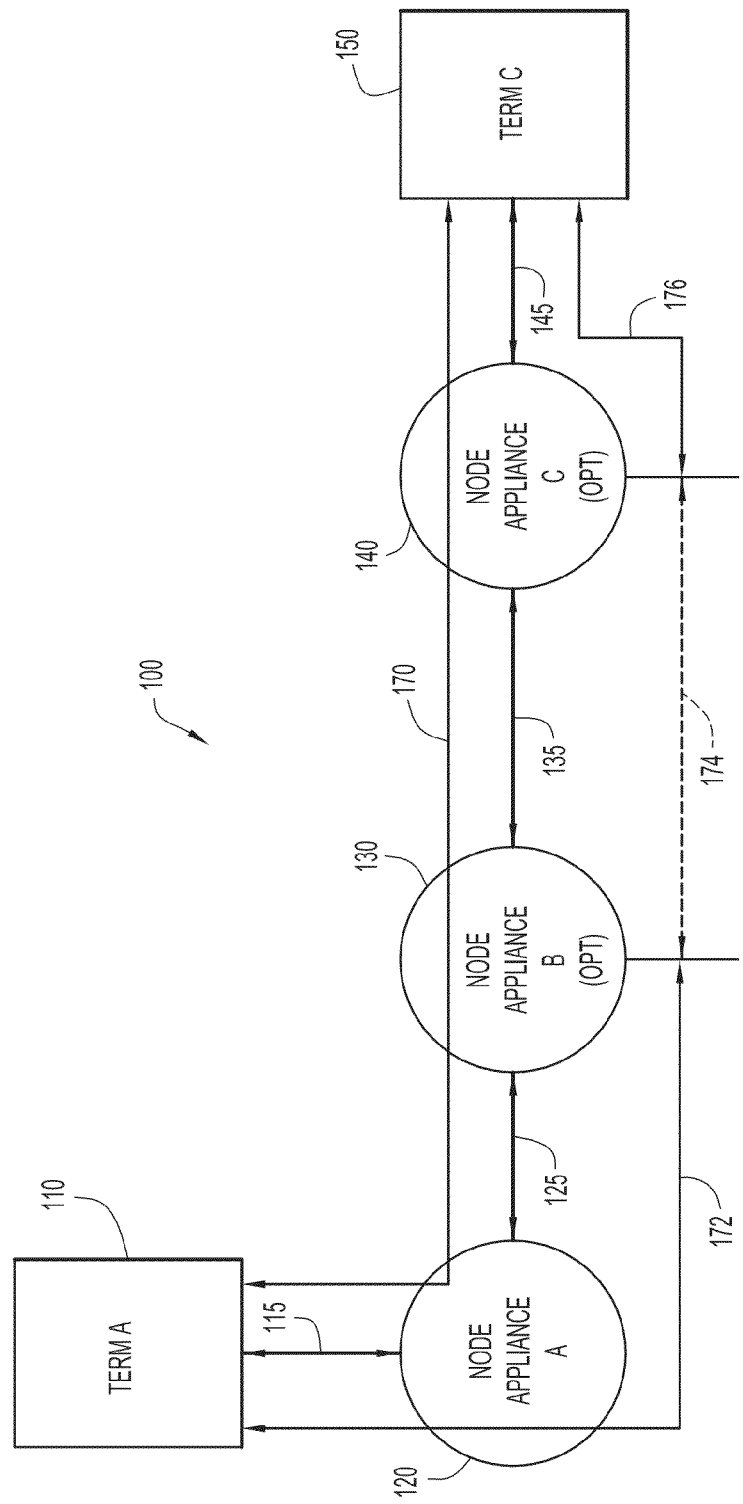
FIG. 1 is block diagram of an example communications network in which transport flow compensation may be implemented.

FIG. 1 illustrates an example communications network 100 through which a terminal 110 may communicate with a terminal 140 over a logical connection 170. Communications network 100 may comprise multiple network segments representatively illustrated at network segments 115, 125, 135, 145. As used herein, a network segment is a portion of network 100 through which data are conveyed between endpoints thereof. It is to be understood that a network segment may comprise multiple physical structures that form the physical paths between terminal nodes thereof. Additionally, each network segment 115, 125, 135, 145 may have a number of connections therethrough, where a connection, as used herein, is a virtual circuit established through mechanisms provided by a suitable protocol and by which data are communicated between end points of the established circuit. A connection may traverse multiple network segments and the number of connections extending through each network segment is independent of the number of connections in other network segments.

In certain implementations, network segments 115, 125, 135, 145 in communications network 100 may be of separate and distinct communication medium type. Due to the physical properties of each communication medium, access to data of connection 170 may use different media access protocols that mitigate varying channel quality, where a communications channel or simply channel, as used herein, is a specific electromagnetic signal carried in the communication medium of the corresponding network segment from which data can be extracted, such as by demodulation and decoding. Channel quality, as used herein, refers the state of the channel that establishes the extent to which data are recoverable therefrom, e.g., high channel quality allows extraction of all data in the channel, and under low quality conditions, data are only partially extracted, if at all. In one implementation, network segment 115 may be in a communication medium, e.g., a gas, and a channel therein may be that of an electromagnetic signal of a specific wavelength carried through free-space wave propagation. Network segments 125, 135 and 145 may be constructed from solid materials carrying a modulated electrical signal in a channel therein. The ordinarily skilled artisan will appreciate that the quality of any channel of network 100 can influence data flow in the overall connection 170. Data flow is greater when channel errors due to low quality conditions are not interpreted as transport errors, which may result in transport control mechanisms unnecessarily interceding.

The communications network 100 includes a plurality of node appliances 120, 130, 140 at which a first network segments 125 and a second network segment 135 are terminated. It is to be understood that any ordinals used herein, e.g., first, second, etc., are not intended to imply physical or logical ordering and no such ordering should be inferred therefrom. Node appliances 120, 130, 140 may be any network device through which data of connection 170 may pass, such as routers, gateways, firewalls, etc. Appliances 130, 140 may be flow optimized such that network traffic in network segment 135 may be controlled under independent flow and/or congestion control. To that end, node appliances 120, 130 may comprise functional mechanisms by which connection 170 is constructed from spliced connections, where splicing, as used herein, refers to logically routing traffic of a connection, e.g., connection 170, for purposes of independent processing and/or control of the routed traffic. Splicing provides linkage between transport connection segments in an end-to-end connection whereby independent processing and/or control may be applied in the connection segments without interfering with the end-to-end processing and/or control mechanisms of the overall connection. Thus, connection 170 may be viewed as a series of first, second and third spliced connections 172, 174, 176 and node appliances 130, 140 may cooperate to control and/or separately process traffic flow in network segment 135 in a manner that is transparent to terminals 110 and 140. For example, duplicated data may be expunged in intermediate connection 174, data may be compressed and uncompressed at opposite ends of intermediate connection 174, and object caching, latency reduction, traffic shaping and other such processes may be applied whereby the utilization efficiency of network segment 135 is enhanced over the absence of such application. A set of such optimization techniques may be implemented by one or more node appliances, such as node appliances 130, 140, and such implementation will be referred to herein as data-transfer efficiency (DTE) optimization.

In certain situations, lowered channel quality in one segment, e.g., segment 115, may be carried into other segments as lost packets, which may be diagnosed as caused by congestion. For example, if segment 115 is implemented by radio channels, some traffic thereof may be dropped due to problems in radio transmission with all other system components operating at under maximum capacity thresholds. Under such conditions, traffic buffers at node appliance 120 may have usable capacity, but transport congestion recovery and/or avoidance mechanisms may nevertheless be activated in response to the dropped traffic. One or more node appliances, for example node appliance 130, may implement functionality that overrides the normal transport congestion routines for traffic on intermediate connection 174, such that channel quality errors do not propagate through network 100 as congestion. Such functionality will be referred to herein as channel quality transport (CQT) compensation and may be applied to networks comprising network segments of different media. CQT optimization may apply independent transport control across connection segments 172, 174 to compensate for transport errors that are caused by channel quality degradation, but without modification to the end-to-end transport control of the overall connection 170.

Figure 2:
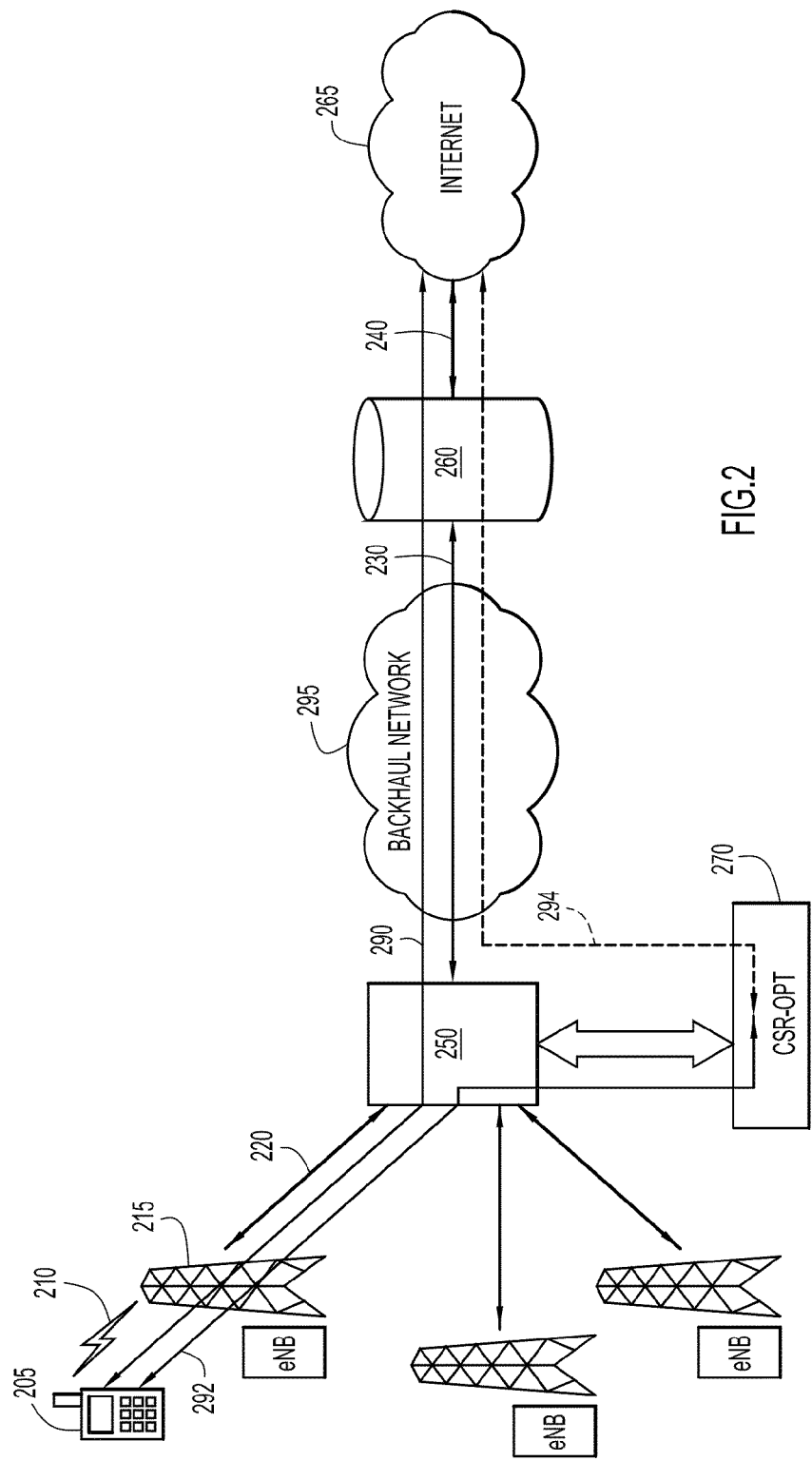
FIG. 2 is a block diagram of an example mobile communications network in which transport flow compensation may be implemented.

An example mobile communications network 200 is illustrated in FIG. 2 and includes one or more base stations, representatively illustrated at evolved Node B (eNB) 215, a cellular site router (CSR) 250 and a mobile gateway (MGW) 260 by which a mobile user device, representatively illustrated at cellular phone 205, can access the Internet 265. Communications network 200 comprises radio communication channel network segment 210, in which a radio communication channel, referred to herein as simply an airlink or over-the-air communication medium, is established, a cell site segment 220, a backhaul network segment 230 and an Internet segment 240. Network segments 210, 220, 230 and 240 may implement common traffic flow mechanisms, such as those implemented by the standardized Transmission Control Protocol (TCP). A CSR transport optimizer (CSR-OPT) 270 may be communicatively coupled to CSR 250 to independently control traffic flow to and from eNBs 215 to which CSR 250 are connected. To that end, an end-to-end connection, representatively illustrated at connection 290, may be spliced into connection segments 292, 294, such as by techniques described below.

CSR-OPT 270 may implement CQT compensation to override certain TCP processes in the presence of poor channel quality on airlink 210. Data packets to and from mobile device are received at CSR-OPT 270 through spliced connection 292 and may be analyzed to determine the load on one or more base stations 215 as well as to determine the number of packets, if any, that have been dropped at CSR router 250. For example, CSR-OPT 270 may maintain a weighted average of the number of connections 290 for which data packets have been dropped over a user-configurable temporal interval. Additionally, CSR 250 may compute and maintain cellular site load information across the base stations 215 to which it is connected. Such may be achieved by monitoring a network metric, such as average queue size assigned to each base station 215, and maintaining an average thereof. The cellular site load information may be provided to CSR-OPT 270 for each base station 215, which may be identified by respective Internet Protocol (IP) addresses. From the cellular load information and the dropped packet information, CSR-OPT 270 may determine whether missing data are from poor channel quality on airlink 210 or from traffic congestion. For example, upon a determination that the cellular site load is high, e.g., above some load threshold, and the average number of connections that have experienced packet drops is also high, e.g., above some dropped-packet threshold, CSR-OPT 270 may determine that, within some finite probability, the data loss is due to congestion. In such a case, CSR-OPT 270 allows normal TCP congestion control processes, such as decreasing the size of the TCP congestion window and retransmitting lost packets, to take effect. On the other hand, if it is determined that the cellular site load is below the load threshold and yet the average number of connections that have experienced packet drops is above the dropped-packet threshold, CSR-OPT 270 may determine, within some finite probability, that the cause of lost packets is due to poor channel quality in the airlink carried in network segment 210. In this case, CSR-OPT 270 may override the normal TCP congestion control to retransmit the lost data while retaining the TCP congestion window size currently in force. Other threshold criteria may be used in the decision logic without departing from the foregoing concepts.

Figure 3A:
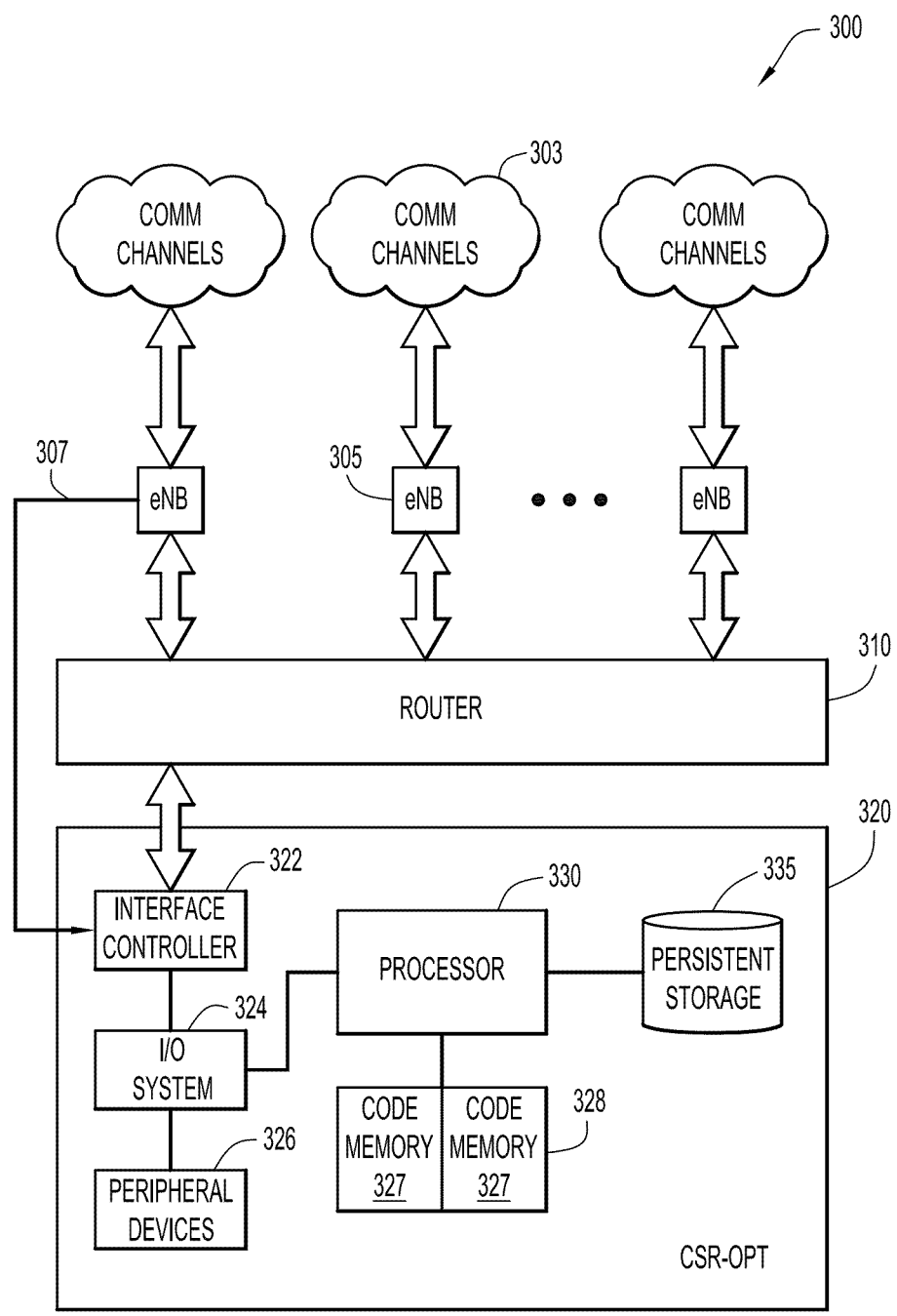
FIG. 3A-3B are schematic block diagrams of an example cellular site optimization appliance in which transport flow compensation may be implemented.

FIG. 3A depicts a communications network 300 into which a CSR-OPT 320 is incorporated. Network 300 may be similar to those discussed above and includes one or more base stations, exemplified by eNB 305 communicatively coupled to respective communication channels, representatively illustrated at channels 303, and to a router 310 suitable for cellular site packet routing. Router 310 may be communicatively coupled to CSR-OPT 320 through an interface controller 322. Interface controller 322 may include appropriate electrical interconnect hardware electrically connected to suitable circuitry to implement interfacing functions described below with reference to FIG. 3B.

CSR-OPT 320 may be communicatively coupled to one or more base stations 305, as illustrated by signal 307, to receive supplementary information regarding radio channel quality, referred to herein as airlink parameters. Monitored airlink parameters may include Ec/Io, i.e., the ratio of the energy in a received pilot signal to that of total received energy. Parameters may also include received signal code power (RSCP) and received signal strength indication (RSSI) key performance indicators (KPI). Such parameters may be used to augment the determination of channel quality from which low data throughput can be assessed.

CSR-OPT 320 may include an input/output (I/O) system 324 through which communication with peripheral devices, collectively represented at block 326, is achieved. Peripheral devices 326 may include display devices, one or more Human Interface Devices (HIDs), test and monitoring equipment, and so on. Additionally, I/O system 324 may be communicatively coupled to interface controller 322, through which communication with router 310 is carried out.

CSR-OPT 320 may include a processor, such as a microprocessor or microcontroller, to execute suitably programmed processor instructions, referred to herein as software, by which the functionality of CSR-OPT may be achieved. To that end, a storage unit 328 may be utilized to store data and processing instructions on behalf of the CSR-OPT 320. The storage unit 328 may include multiple segments, such as code memory segment 327 to maintain processor instructions to be executed by the processor 330, and data memory segment 329 to store data, such as data structures on which the processor 330 performs data manipulation operations. Storage unit 328 may include memory that is distributed across components, to include, among others, cache memory and pipeline memory.

CSR-OPT 320 may include a persistent storage system 335 to store data and processing instructions across processing sessions. Persistent storage system 335 may be implemented in a single persistent memory device, such as a hard disk drive, or may be implemented in multiple persistent memory devices, which may be interconnected by a communication network.

Figure 3B:
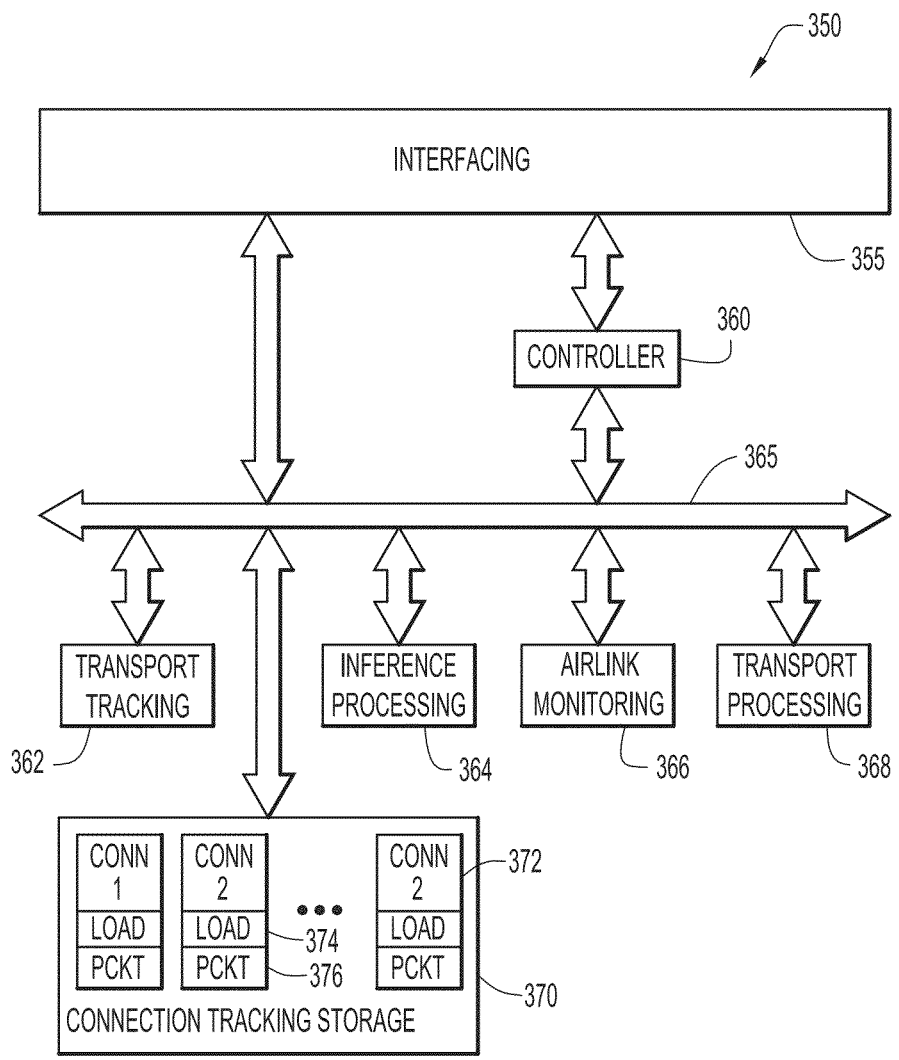

FIG. 3B illustrates an example configuration of functional components suitable to practice CQT compensation. The example system illustrated in FIG. 3B may be implemented through processing instructions executed on the processor 330 to form, in cooperation with other components illustrated in FIG. 3A, a CSR optimizer 350 on the CSR-OPT 320.

CSR optimizer 350 may include a process controller 360 to coordinate and control the interoperations of the functional components thereof so as to achieve a fully operational CQT compensation apparatus. Process controller 360 may be communicatively coupled to other components of CSR optimizer 350 through suitable message passing, signaling and/or other control operations, representatively illustrated by bus 365, to receive and pass data between components, to format data into a command and/or a data location in memory, and to convey such information to the applicable functional module of CSR optimizer 350. Process controller 360 may subsequently receive processed data from the applicable functional module and forward the data to another functional module. The process controller 360 may perform other coordination and control operations according to the implementation of the CSR optimizer 350, and such other operations, as well as the implementation of such, can be embodied by a wide range of well-known process control methods and apparatuses, including multi-threaded and distributed process control methodologies.

Data storage 335 in FIG. 3A may comprise read only memory (ROM), random access memory (RAM), magnetic disk storage media devices, optical storage media devices, flash memory devices, electrical, optical, or other physical/tangible memory storage devices. The processor 330 is, for example, a microprocessor or microcontroller that executes instructions for the CQT compensation logic. Thus, in general, the memory 335 may comprise one or more tangible computer readable storage media (e.g., a memory device) encoded with software comprising computer executable instructions and when the software is executed (by the processor 330), it is operable to perform the operations described herein in connection with interfacing 362, process controlling 360, transport tracking 362, inference processing 364, airlink monitoring 366, and/or transport processing 368.

Interfacing processor 355 communicates with a node appliance, such as router 310, to, among other things, form and control spliced connections. Interface processor 355 may be interoperable with interface controller 322 so as to continuously monitor traffic passing through CSR 250. During the setup of a connection, e.g., connection 290, a TCP synchronization (SYN) packet from cell phone 205 bound for a terminal (not illustrated) on the Internet 265, such as a web server, may be detected by interface processor 335. Interface processor 355 may record pertinent connection data, such as the source and destination port numbers, the source and destination IP addresses, sequence numbers, etc., and sends a SYN acknowledgement (SYN-ACK) packet towards cell phone 205 as a proxy of the Internet terminal. Cell phone 205 completes the connection with CSR-OPT 270 via an acknowledgement (ACK) packet, at which time connection segment 292 is established. Interface processor 355 may then execute a similar procedure between CSR-OPT 270 and the Internet terminal to establish connection segment 294 as a proxy of cell phone 205. The resulting connection segments 292, 294 operate under independent transport control state machines coordinated by interfacing processor 355, by which the connection segments 292, 294 are spliced into connection 290. Additionally, interfacing processor 355 may apply suitable translation functionality on data packets transported across connection segments 292, 294, such as translating sequence numbers, recomputing checksums, etc. The data transport across the spliced connection 290 may thus proceed transparently to cell phone 205 and the Internet terminal while under independent transport control in the spliced connection segments 292, 294.

Transport tracking processor 362 may obtain information on the state of different connections passing through router 310 and store state information in connection tracking storage 370. For each connection associated with router 310, a table 372 may be maintained and updated at user-configurable intervals. For example, tracking processor 362 may periodically receive load data, e.g., data queue size, for the connection segments of each connection and store such information in table 372 at a designated location 374 therein. Additionally, a number of dropped packets from each connection segment may be stored at a designated location 376 in table 372. Other connection oriented data, including data for performing the translating described above, may be tracked in table 372 per the requirements of the implementation.

Figure 4:
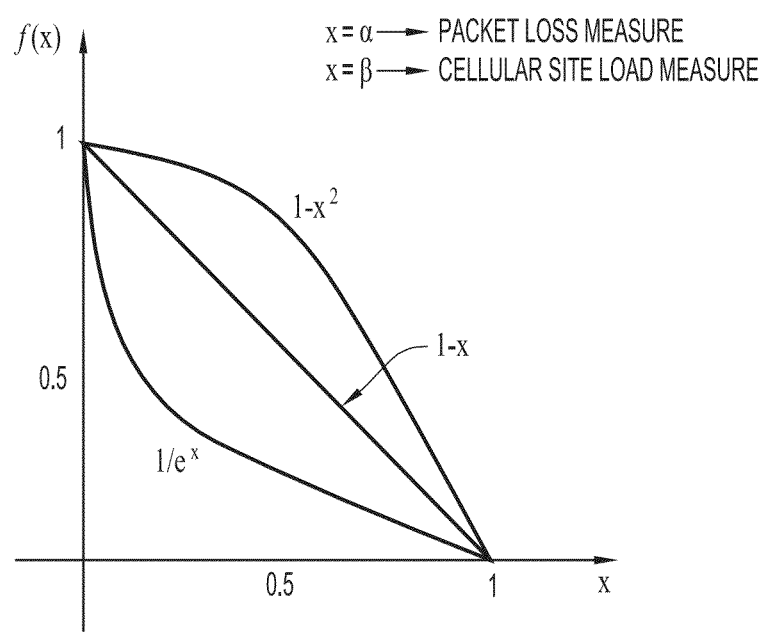
FIG. 4 is a graph depicting example probability functions to infer link quality.

Inference processor 364 may utilize the connection tracking data in tables 372 to determine whether lost data can be attributed, within some probability, to poor channel quality. Certain characteristics from which an inference may be drawn may be known. For example, FIG. 4 illustrates example curves f(x) representative of some network parameter, such as throughput. When x=$\alpha$, i.e., a measure of dropped packets, f($\alpha$), as given by one of the illustrated curves, indicates the manner in which throughput, or some other network metric, decreases as dropped packets increase. When x=$\beta$, i.e., the cellular site load, f ($\beta$) indicates the manner in which throughput decreases as load increases. The values of $\alpha$ and $\beta$ may be determined from data of individual and aggregated connections tracked in connection tracking storage 370. Inference processor 364 may compute some probability P($\lambda$), where $\lambda$ attributes the cause of failed transport to poor channel quality alone, from f($\alpha$) and f($\beta$). For example, inference processor 364 may compute P($\lambda$)=w·f($\beta$)+(1−w)·f($\alpha$), where w is a weighting value that limits the probability to at most unity. Airlink processor 366 may be communicatively coupled to base stations 305 to receive and maintain airlink parameters that may be utilized to augment the channel quality determination so as to increase reliability of the inference.

Transport processor 368 applies transport control in accordance with the determination of inference processor 364. For example, upon P($\lambda$) meeting some inference threshold that indicates a high probability that transport failures are due to poor channel quality, transport processor 368 may retransmit the missing packets of one or more connections without applying congestion recovery/avoidance. On the other hand, upon P(λ) failing to meet the inference threshold, transport processor may, for example, decrease the congestion window and retransmit the missing packets as well as new data packets under the temporal constraints thereof.

Figure 5:
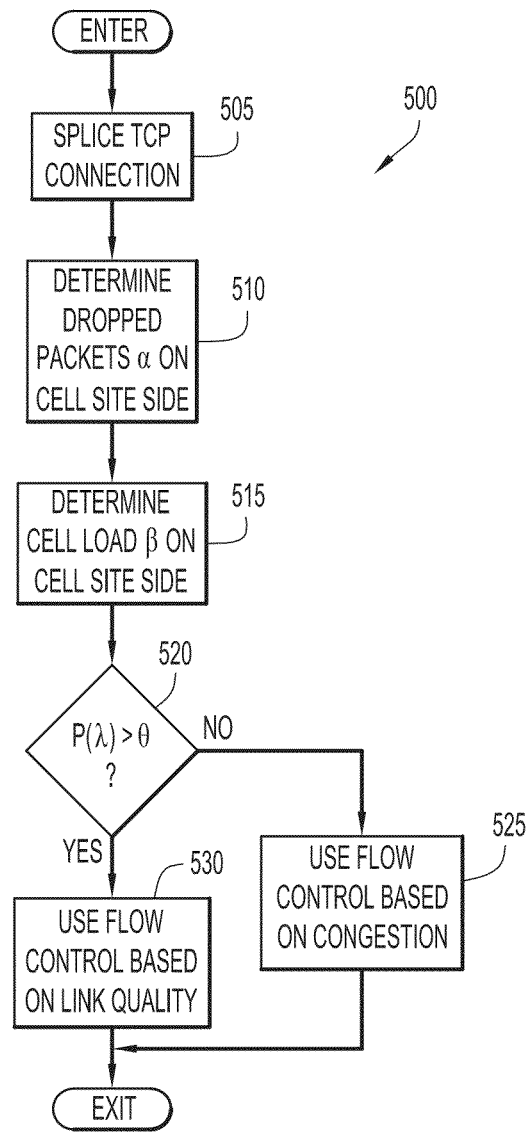
FIG. 5 is a flow diagram of an example channel quality transport compensation process.

FIG. 5 illustrates an example CQT compensation process 500. In operation 505, TCP connections are spliced at a suitably configured network appliance, such as an optimizing CSR. For example, connection segments may be established and spliced, such as through techniques described above. In operations 510 and 515, the number of packets dropped and load, respectively, on the cellular site side of CSR are determined. In operation 520, it is determined whether the probability P(λ), i.e., the probability that the packet drops are due to poor channel quality alone, is above some threshold θ. If so, transport flow control proceeds based on poor channel quality in operation 530. Channel quality transport flow control may be that by which lost data are retransmitted and congestion recovery/avoidance is not applied. If P(λ)≤θ, as determined in operation 520, normal transport flow control may be applied in operation 525, e.g., decreasing the congestion window size and retransmitting lost data.

The above description is intended by way of example only.

What is claimed is:

1. A method comprising:
    establishing a spliced transport connection through network segments and through which network data are conveyed;
    establishing a communication channel carrying the network data in a connection segment of the spliced transport connection;
    determining a channel quality of the channel;
    generating, based on the channel quality, a probability value indicative of whether packets dropped in the connection segment are due to poor channel conditions alone and not due to traffic congestion;
    comparing the probability value with a predetermined threshold value; and
    applying independent transport control on the connection segment based on the comparison of the probability value with the predetermined threshold value.

2. The method of claim 1, wherein establishing the spliced transport connection includes:
    establishing as the connection segment a transport connection between a terminal device and an intermediate node device communicatively coupling the network segments;
    establishing as another connection segment of the spliced transport connection another transport connection from the intermediate node device to another terminal device; and
    translating transport control data between the connection segment and the other connection segment such that the network data are transported across the spliced transport connection formed thereby transparently to the terminal device and the other terminal device.

3. The method of claim 2, wherein establishing the communication channel includes:
    establishing a communication medium in a network segment between the terminal device and a media access node device communicatively coupled with the intermediate node device via another network segment, the communication medium being different than that used in the other network segment; and
    establishing the communication channel via an electromagnetic signal carried in the communication medium of the network segment.

4. The method of claim 3, wherein determining the channel quality includes:
    establishing an inference relationship between measured traffic parameters in the connection segment and recoverability of the network data from the electromagnetic signal carried in the communication medium;
    measuring the traffic parameters; and
    determining the channel quality from the inference relationship based on the measured traffic parameters.

5. The method of claim 4, wherein measuring the traffic parameters excludes direct measurement of traffic in the network segment.

6. The method of claim 5, wherein measuring the traffic parameters includes:
    measuring a load on the other network segment through which the connection segment of the communication channel is carried; and
    measuring a percentage of packets dropped over a plurality of connections in the other network segment carrying the connection segment.

7. The method of claim 6, wherein establishing the inference relationship includes:
    establishing a probability function representing the probability that the packets dropped in the connection segment are due to the poor channel conditions alone given the measured load and the measured percentage of dropped packets.

8. The method of claim 7, wherein determining the channel quality from the inference relationship includes:
    indicating that the channel quality is poor upon the probability provided by the probability function meeting a load threshold and a dropped-packet threshold criterion.

9. The method of claim 7, wherein applying the independent transport control includes:
    excluding a transport protocol congestion window from size-reduction thereof in the connection segment upon the determination that the channel quality is poor.

10. The method of claim 4, wherein the communication medium is an over-the-air communication medium and measuring the traffic parameters includes direct measurement of radio quality parameters in the network segment.

11. A non-transitory computer readable medium having instructions persistently encoded thereon that, when executed by a processor, cause the processor to:
    establish a spliced transport connection through network segments and through which network data are conveyed;
    establish a communication channel carrying the network data in a connection segment of the spliced transport connection;
    determine a channel quality of the channel;
    generate, based on the channel quality, a probability value indicative of whether packets dropped in the connection segment are due to poor channel conditions alone and not due to traffic congestion;
    compare the probability value with a predetermined threshold value; and
    apply independent transport control on the connection segment based on the comparison of the probability value with the predetermined threshold value.

12. The computer readable medium of claim 11, wherein the instructions that cause the processor to establish the spliced transport connection include instructions operable to:

establish as the connection segment a transport connection between a terminal device and an intermediate node device communicatively coupling the network segments;

establish as another connection segment of the spliced transport connection another transport connection in another network segment from the intermediate node device to another terminal device;

translate transport control data between the connection segment and the other connection segment such that the networked data are transported across the spliced transport connection formed thereby transparently to the terminal device and the other terminal device;

establish an inference relationship between measured traffic parameters in the connection segment and recoverability of the network data from an electromagnetic signal carried in a communication medium of a network segment carrying the connection segment between the terminal device and a media access node device communicatively coupled to the communication medium, the communication medium being different than that used in the other network segment;

measure the traffic parameters; and determine the channel quality from the inference relationship based on the measured traffic parameters.

13. The computer readable medium of claim 12, and further comprising instructions that cause the processor to:

measure a load on the other network segment through which the connection segment of the communication channel is carried as one of the traffic parameters;

measure a percentage of packets dropped over a plurality of connections in the other network segment carrying the connection segment as another of the traffic parameters;

establish a probability function representing the probability that the packets dropped in the connection segment are due to the poor channel conditions alone given the measured load and the measured percentage of dropped packets; and indicate that the channel quality is poor upon the probability provided by the probability function meeting a load threshold and a dropped-packet threshold criterion.

14. The computer readable medium of claim 13, and further comprising instructions that cause the processor to:

exclude a transport protocol congestion window from size-reduction thereof in the connection segment upon the determination that the channel quality is poor.

15. An apparatus comprising:

a network interface unit configured to convey network data arriving thereat through network segments communicatively coupled thereto; and a processor communicatively coupled to the network interface and configured to:

establish a spliced transport connection through the network segments, the spliced transport connection comprising a connection segment between a terminal device and the network interface and another connection segment from the network interface to another terminal device;

translate transport control data between the connection segment and the other connection segment such that the networked data are transported across the spliced transport connection formed thereby transparently to the terminal device and the other terminal device;

communicate the network data to and from a communication channel established in the connection segment of the spliced transport connection;

determine a channel quality of the communication channel;

generate, based on the channel quality, a probability value indicative of whether packets dropped in the connection segment are due to poor channel conditions alone and not due to traffic congestion;

compare the probability value with a predetermined threshold value; and apply independent transport control on the connection segment based on the comparison of the probability value with the predetermined threshold value.

16. The apparatus of claim 15, wherein the processor is further configured to:

exclude a transport protocol congestion window from size-reduction thereof in the connection segment upon a determination that failure in data transport therein is due to other than transport congestion.

17. The apparatus of claim 16, wherein the processor is further configured to:

communicate with the communication channel as an electromagnetic signal carried in a communication medium of a network segment between the terminal device and a media access node device communicatively coupled with the network interface via another network segment, the communication medium being different than that used in the other network segment.

18. The apparatus of claim 17, wherein the processor is further configured to:

establish an inference relationship between measured traffic parameters in the connection segment and recoverability of the network data from the electromagnetic signal carried in the communication medium;

measure the traffic parameters; and determine the channel quality from the inference relationship based on the measured traffic parameters.

19. The apparatus of claim 18, wherein the processor is further configured to measure the traffic parameters to the exclusion of direct measurement of traffic in the network segment.

20. The apparatus of claim 19, wherein the processor is further configured to:

measure a load on the other network segment through which the connection segment of the communication channel is carried; and measure a percentage of packets dropped over a plurality of connections in the other network segment carrying the connection segment.

21. The apparatus of claim 20, wherein the processor is further configured to:

establish a probability function as the inference relationship representing the probability that the failure in data transport is due to the poor channel conditions in the communication channel alone given the measured load and the measured percentage of dropped packets; and indicate that the channel quality is poor upon the probability provided by the probability function meeting a load threshold and a dropped-packet threshold criterion.

* * * * *